(12) United States Patent
Kurata et al.

(10) Patent No.: US 9,058,140 B2
(45) Date of Patent: Jun. 16, 2015

(54) PRINT CONTROL APPARATUS AND METHOD UTILIZING A PAPER SAVING PRINT SETTING

(75) Inventors: Yasuo Kurata, Kawasaki (JP);
Tadanobu Fujita, Yokohama (JP);
Hiroshi Shintoku, Kawasaki (JP);
Hiroshi Okubo, Kawasaki (JP);
Tetsuhide Takasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 849 days.

(21) Appl. No.: 12/706,699

(22) Filed: Feb. 16, 2010

(65) Prior Publication Data

US 2010/0231960 A1    Sep. 16, 2010

(30) Foreign Application Priority Data

Mar. 10, 2009   (JP) ................. 2009-056096

(51) Int. Cl.
*G06F 3/12*    (2006.01)
*G06K 15/00*    (2006.01)

(52) U.S. Cl.
CPC ............ *G06F 3/1256* (2013.01); *G06F 3/1219* (2013.01); *G06F 3/1232* (2013.01); *G06F 3/1251* (2013.01); *G06K 15/00* (2013.01); *G06K 15/007* (2013.01)

(58) Field of Classification Search
CPC ... G06F 3/1208; G06F 3/1251; G06F 3/1254; G06F 3/1256; G06F 3/1258; G06F 3/1284; G06F 3/1219; G06F 3/1232; G06K 15/00; H04N 1/2338; H04N 1/2369

USPC ................................................ 358/1.15, 1.18
See application file for complete search history.

(56) References Cited

U.S. PATENT DOCUMENTS

| 5,745,659 | A  | * | 4/1998  | Rigau Rigau et al. ......... 358/1.2 |
|---|---|---|---|---|
| 7,062,190 | B2 | * | 6/2006  | Miyamoto .................... 358/1.13 |
| 7,856,202 | B2 |   | 12/2010 | Mizobuchi et al. |
| 2002/0071689 | A1 | * | 6/2002 | Miyamoto ....................... 399/53 |
| 2007/0211296 | A1 | * | 9/2007 | Toda ............................ 358/1.18 |
| 2008/0008508 | A1 |   | 1/2008 | Mizobuchi et al. |
| 2009/0059289 | A1 | * | 3/2009 | Shintoku et al. ............. 358/1.15 |
| 2009/0168107 | A1 | * | 7/2009 | Takeuchi et al. ............. 358/1.18 |

FOREIGN PATENT DOCUMENTS

CN           101101477       1/2008

(Continued)

OTHER PUBLICATIONS

European Search Report dated Nov. 9, 2012 issued during prosecution of related European application No. 10154447.6.

(Continued)

*Primary Examiner* — Benny Q Tieu
*Assistant Examiner* — Juan M Guillermety
(74) *Attorney, Agent, or Firm* — Fitzpatrick, Cella, Harper & Scinto

(57) ABSTRACT

When a printer apparatus is allowed to execute a printing of a document using paper based on a print setting set by the user, the following processes are executed in order to allow the user to recognize a paper saving print setting. Whether or not there is a print setting which can save an amount of paper compared to the print setting set by the user is determined. If it is determined that a paper saving print setting exists, the user is notified of such a paper saving print setting.

39 Claims, 10 Drawing Sheets

(56) References Cited

FOREIGN PATENT DOCUMENTS

| | | |
|---|---|---|
| EP | 1 215 877 | 6/2002 |
| JP | 2005231154 A | 9/2005 |
| JP | 2006202112 A | 8/2006 |

OTHER PUBLICATIONS

Chinese Office Action dated Feb. 8, 2013 issued during prosecution of related Chinese application No. 201010133385.0 (whole English-language translation included).

* cited by examiner

FIG. 5

| PAPER SAVING FUNCTION | DISCRIMINATION RESULT [True/False] | PAPER SAVING AMOUNT [mm] |
|---|---|---|
| ROTATE PAGE BY 90° | True | 90 |
| ERASE UPPER/LOWER MARGINS (WHEN ROTATION OF PAGE BY 90° IS ON) | True | 50 |
| ERASE UPPER/LOWER MARGINS (WHEN ROTATION OF PAPER BY 90° IS OFF) | True | 150 |

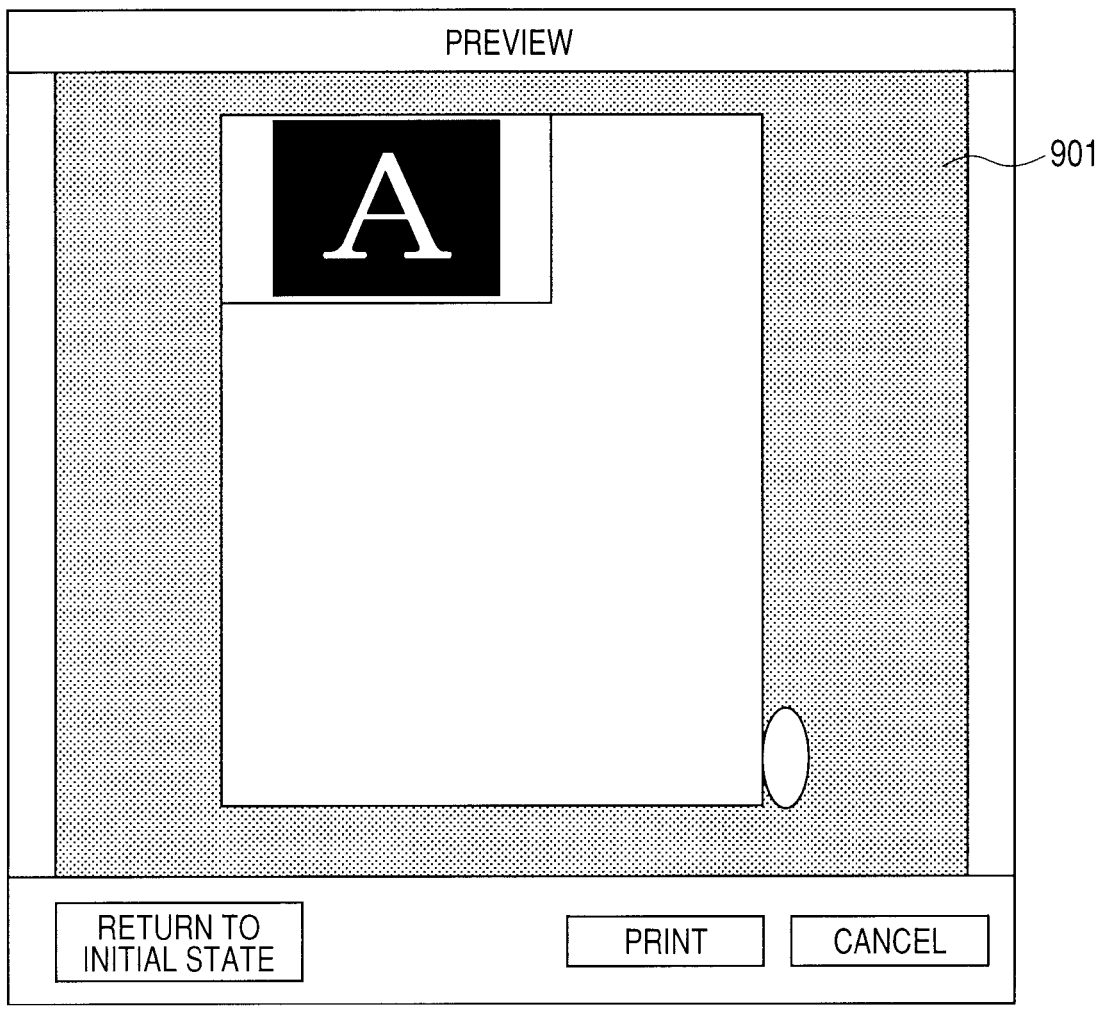

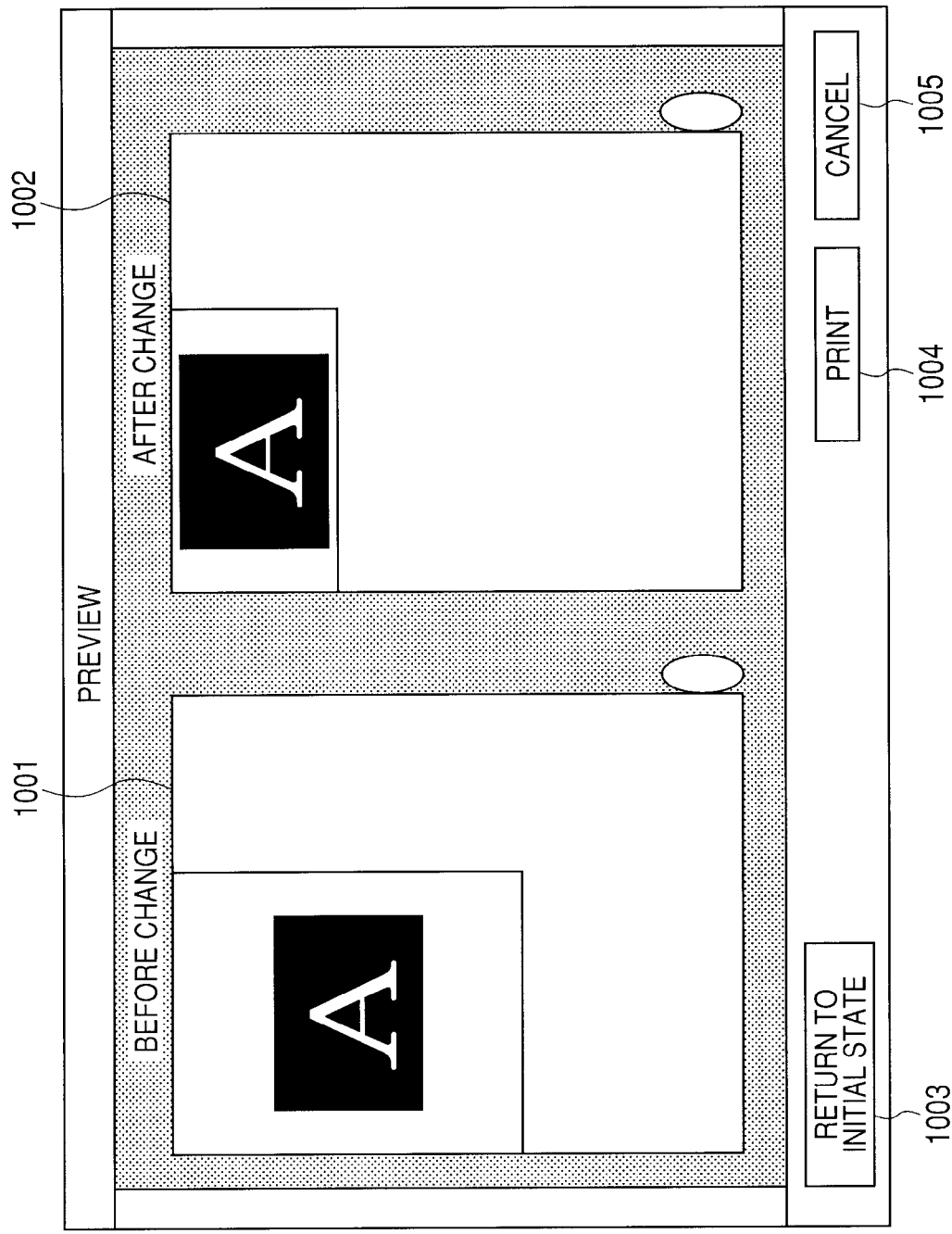

PRINT CONTROL APPARATUS AND METHOD UTILIZING A PAPER SAVING PRINT SETTING

BACKGROUND OF THE INVENTION

1. Field of the Invention

The present invention relates to print control apparatus and method for allowing a printer apparatus to execute a printing based on print settings set by a user.

2. Description of the Related Art

In the related art, when a printer apparatus is allowed to execute a printing, the user makes print settings such as size and orientation of a sheet (or paper) and subsequently instructs the printing. When the printing is instructed, there is also a case where in a printer driver or the like, the printing is executed according to the print settings which have already been made, without displaying a display screen for print setting.

A print preview function for enabling the user to previously confirm how an image is arranged on the paper prior to executing the printing has been known (refer to Japanese Patent Application Laid-Open No. 2006-202112). By using the print preview function, the user can execute the printing after confirming that, for example, if the image is rotated by 90°, the paper can be unwastefully used.

However, in the related art, in order to execute the printing in which the paper is unwastefully used, the user needs to preliminarily know the settings adapted to print without wastefully using the paper and to make such settings.

SUMMARY OF THE INVENTION

It is an aspect of the invention to solve the above problems.

Another aspect of the invention is to allow the user to execute a printing based on print settings in which paper can be saved.

The above-mentioned aspects and further features of the present invention will become apparent from the following description of exemplary embodiments with reference to the attached drawings.

BRIEF DESCRIPTION OF THE DRAWINGS

FIG. 5 is a diagram illustrating a table T1 showing a determination result.

FIG. 9 is a diagram illustrating examples of a print preview.

FIG. 10 is a diagram illustrating examples of a print preview.

DESCRIPTION OF THE EMBODIMENTS

An embodiment of the invention will be described in detail hereinbelow with reference to the drawings. A construction illustrated in the following embodiment is nothing but an example and the invention is not limited to the illustrated construction.

Figure 1:
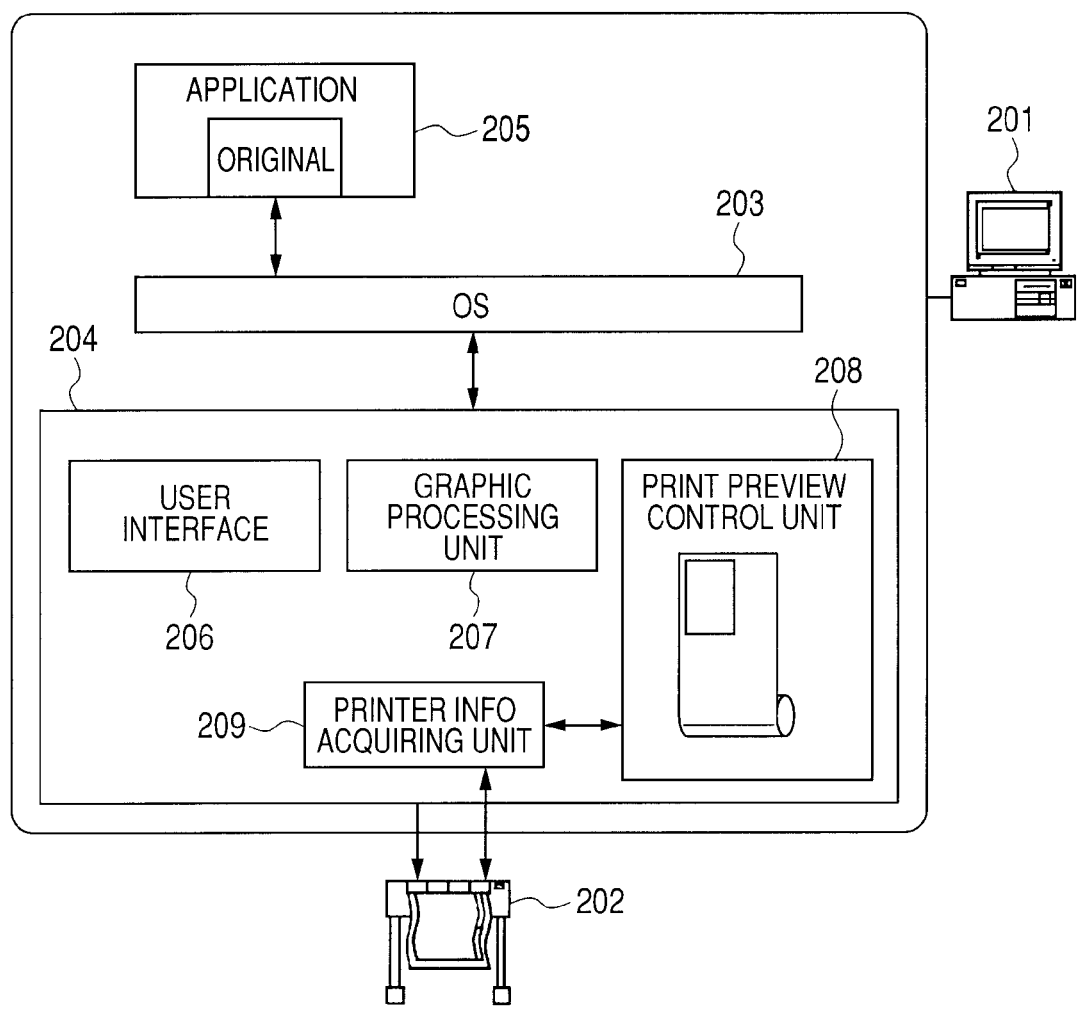
FIG. 1 is a diagram illustrating a construction of a print processing system PR1.

FIG. 1 is a diagram illustrating a construction of a print processing system PR1 including a personal computer (hereinbelow, referred to as a PC) 201 as an example of a print control apparatus of the invention and a large-sized printer (hereinbelow, referred to as a printer) 202 as an example of a printer apparatus. The PC 201 and the printer 202 are mutually connected through a network or a local interface and can exchange various kinds of information.

The PC 201 can be realized by a general personal computer and includes processing modules 203 to 209, which will be described hereinbelow. Those modules can be installed into the PC 201 by using an installer obtained from a storage medium such as a CD-ROM or from the outside. Each module installed into the PC 201 is stored into a storage device of the PC 201. A CPU executes each module, so that processes, which will be described hereinafter, are realized. A display is connected to the PC 201. The various kinds of information are displayed onto the display, thereby enabling the user to be notified of the various kinds of information. Input devices such as keyboard, mouse, and the like are connected to the PC 201. The user inputs various kinds of instructions from the input device with reference to a display screen displayed on the display. The following various kinds of processes are executed according to the contents which were input.

An OS 203 is an operating system. The processing modules 204 to 209 operate on the OS 203. A printer driver 204 controls the operation of the printer 202 according to print settings designated by the user. The printer driver 204 provides at least functions 206 to 208. An application 205 is software to form a desired original (document) as a print target. The user selects the printer 202 from a print menu of the application 205, so that the printer driver 204 can be activated. A user interface (UI) 206 provides a setting display screen which is used by the user to make the print settings or the like. The setting display screen which is provided by the user interface 206 is displayed on the display of the PC 201. A graphic processing unit 207 processes the original obtained from the application 205 according to the print settings designated by the user and converts it into print data which can be handled by the printer 202.

The user interface 206 forms display screen information which is used by the user to make various kinds of settings such as print setting and the like. An operating display screen based on the display screen information is displayed on the display of the PC 201. According to the print settings set based on the display screen information formed by the user interface 206, the graphic processing unit 207 converts the original received from the application 205 into the print data of a format which can be handled by the printer 202. Before the original received from the application 205 is printed by the printer 202, a print preview control unit 208 forms print preview information showing how an image based on the original is arranged on the sheet. The print preview information formed here is displayed on the display of the PC 201. A printer information acquiring unit 209 acquires various kinds of information such as size information and the like of the set paper from the printer 202.

The printer 202 receives the print data transmitted from the PC 201 and prints the image onto the paper according to the print data. When the image is printed, one of ink and toner is used as a recording material. The printer 202 can use roll paper as paper (recording medium) to print the image. The printer 202 prints the image by applying the recording material onto the roll paper which is fed from a roll paper feeding unit. A material of the recording medium is not limited to the paper but various kinds of materials can be used. However, it is assumed hereinbelow that the recording medium is expressed as roll paper. When the image is printed onto the roll paper, based on an instruction from the printer driver 204, the printer 202 can print the image of an arbitrary length (in a paper feeding direction) so long as it is a permissible length. After completion of the printing of the length designated from the printer driver 204, the roll paper can be cut. The printer 202 may be provided with a feeding unit for the cut paper and can also print the image onto the cut paper. As size information, the printer 202 transmits information showing a width of roll paper with respect to the roll paper and information showing a width/length size with respect to the cut paper, to the printer information acquiring unit 209.

Figure 2:
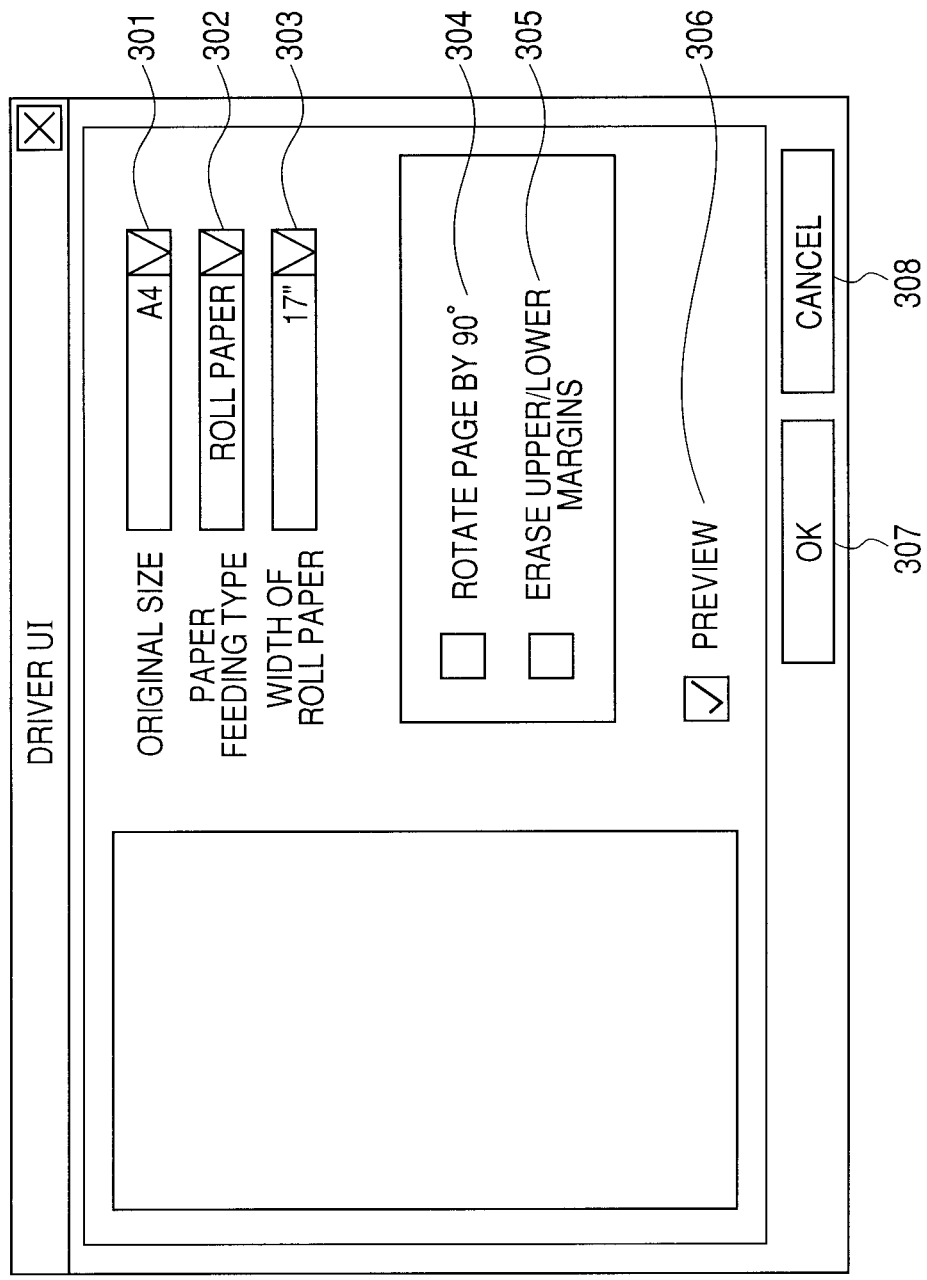
FIG. 2 is a diagram illustrating a user interface of a printer driver.

Subsequently, the operation contents at the time when the user instructs the printing from the PC 201 will be described. FIG. 2 illustrates an operating display screen (driver UI) which is displayed on the display of the PC 201 based on the display screen information which is formed by the user interface 206. The display screen of FIG. 2 is displayed in the case where the user selected the printer 202 from the print menu of the application 205.

In FIG. 2, a combo box 301 is provided to designate the size of original formed by the application 205. The original size designated when the original is formed by the application 205 is automatically input. When a different size is designated here, the original is zoomed according to the size. A combo box 302 is provided to designate a type of feeding the paper which is used to print the image. As a paper feeding type which can be designated, there is roll paper, a cassette (in which the cut paper has been set), a manual insertion, or the like. If there are a plurality of paper feeding units which can feed the roll paper, a paper feeding stage can be also designated. A combo box 303 displays the width of roll paper set in the printer 202. When the roll paper is selected as a paper feeding type, the roll paper width is acquired from the printer 202 by the printer information acquiring unit 209. However, if the roll paper width cannot be acquired from the printer 202 by the printer information acquiring unit 209, it may be selected by the operation of the user and displayed. In the subsequent processes, the roll paper width acquired by the printer information acquiring unit 209 or the roll paper width selected by the user is also similarly handled. When the cassette is selected as a paper feeding type, a size of cut paper (size of the A series or the B series of ISO) is displayed.

A check box 304 is one of paper saving functions and is provided to designate whether or not the original is rotated by 90° to execute printing. If the paper feeding type indicates the roll paper and the original is vertically long and a length of long side of the original is equal to or less than the width of roll paper, the original is rotated by 90° for printing, whereby margins (portions other than the original) are smaller than margins which are obtained by printing in a state where the original is held to be vertically long. Thus, since a paper feeding amount is decreased, the paper can be saved. In such a case, by marking the check box 304, the graphic processing unit 207 allows the original to be rotated and, thereafter, transmits the print data to the printer 202. In a case, though the original was rotated by 90°, the paper saving cannot be accomplished (for example, in the case where the original is vertically long and the length of long side of the original is longer than the width of roll paper), the printing is not executed even if the check box 304 was marked.

A check box 305 is one of the paper saving functions and is provided to designate whether or not portions (upper and lower margins) in which a valid image (image to which the recording material should be applied upon printing) is not included in the original received from the application 205 are erased. When the paper feeding type indicates the roll paper and the upper and lower (portions corresponding to the upstream and downstream positions in the paper feeding direction of the roll paper) margins of the original are erased irrespective of the designated original size, an amount of the roll paper which is used can be reduced, so that the paper can be saved. In such a case, by marking the check box 305, the graphic processing unit 207 allows the upper and lower portions where the valid image is not included to be erased from the original, and thereafter transmits the print data to the printer 202.

Although the case where the page is rotated by 90° and the case where the upper and lower margins are erased have been shown as paper saving functions, the invention is not limited to them but a function of saving the paper by another method may be added, the above method may be replaced by another method, or one of the above two methods may be used.

A check box 306 is provided to designate whether or not a print preview is performed before executing the printing. If an OK button 307 is designated in a state where the check box 306 has been marked, the print preview is executed. If the printing is instructed after the print preview was executed, the print data is transmitted to the printer 202. If the OK button 307 is designated in a state where the check box 306 is not marked, the print data is transmitted to the printer 202 without executing the print preview.

If the OK button 307 is designated, the print data to which the foregoing setting contents have been reflected is sent to the graphic processing unit 207 and the window (driver UI) of FIG. 2 is closed. When the print preview is executed, the graphic processing unit 207 transmits the print data to which the contents set by the driver UI have been reflected to the print preview control unit 208. If the print preview is not executed, the print data is transferred to the printer 202 and the printing is executed. If a cancel button 308 is designated, the contents which have been set and changed by the user on the display screen of FIG. 2 are not validated and the window of FIG. 2 is closed in a state before the display screen of FIG. 2 is displayed.

Figure 3:
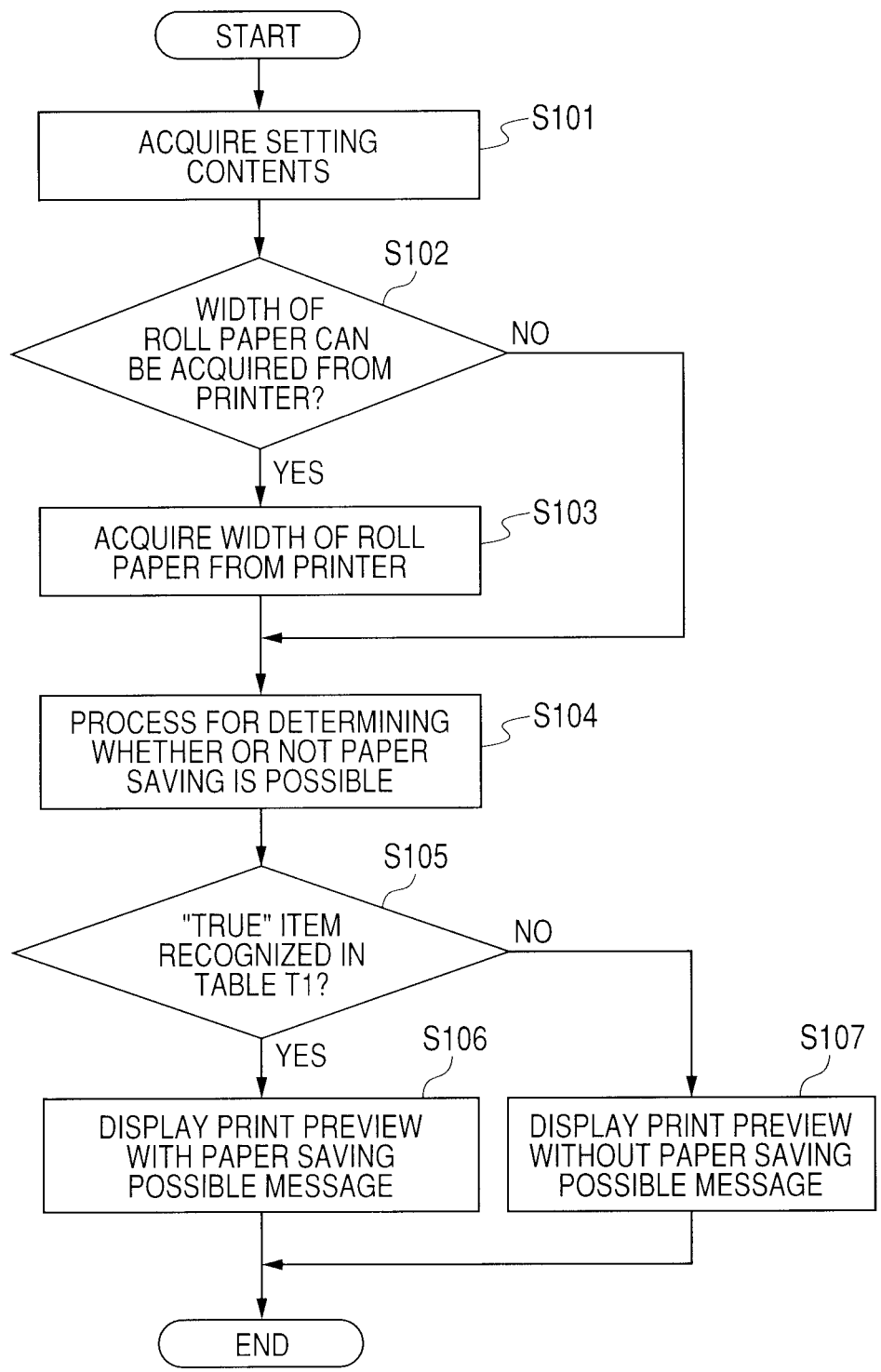
FIG. 3 is a flowchart illustrating a flow for processes at the time of activating the printer driver.

Subsequently, a flow for processes when the printer driver 204 is activated will be described. FIG. 3 is a flowchart illustrating a flow for the processes. The flowchart shows the processes which are executed in the case where the CPU of the PC 201 reads out the program of the printer driver 204 from a storage device, loads it into the RAM, and executes the program.

When the user forms the original as a print target by the application 205 and selects the printer 202 from the print menu of the application 205, the printer driver 204 is activated and the contents which have been set at present by the combo boxes 301 and 302 and the check boxes 304 to 306 in FIG. 2 are acquired (S101). It is assumed here that the "roll paper" has been set as a paper feeding type and the check box 306 has been marked.

Subsequently, whether or not size information (in this instance, since the paper feeding type indicates the roll paper, the width of roll paper) of the paper which is used for printing can be acquired from the printer 202 is determined in the printer information acquiring unit 209 (S102). If it can be acquired, information of the width of roll paper which has been set in the printer 202 at present and is used for printing is acquired by the printer information acquiring unit 209 in S103. If it cannot be acquired, information of the width of roll paper which has been designated in the combo box 303 is acquired. The acquired information of the roll paper width is stored into the RAM in the PC 201.

Subsequently, the processing routine advances to S104 and whether or not the printing in which the paper is saved can be performed is determined based on the size of original as a print target and the width of roll paper which is used for printing.

Figure 4:
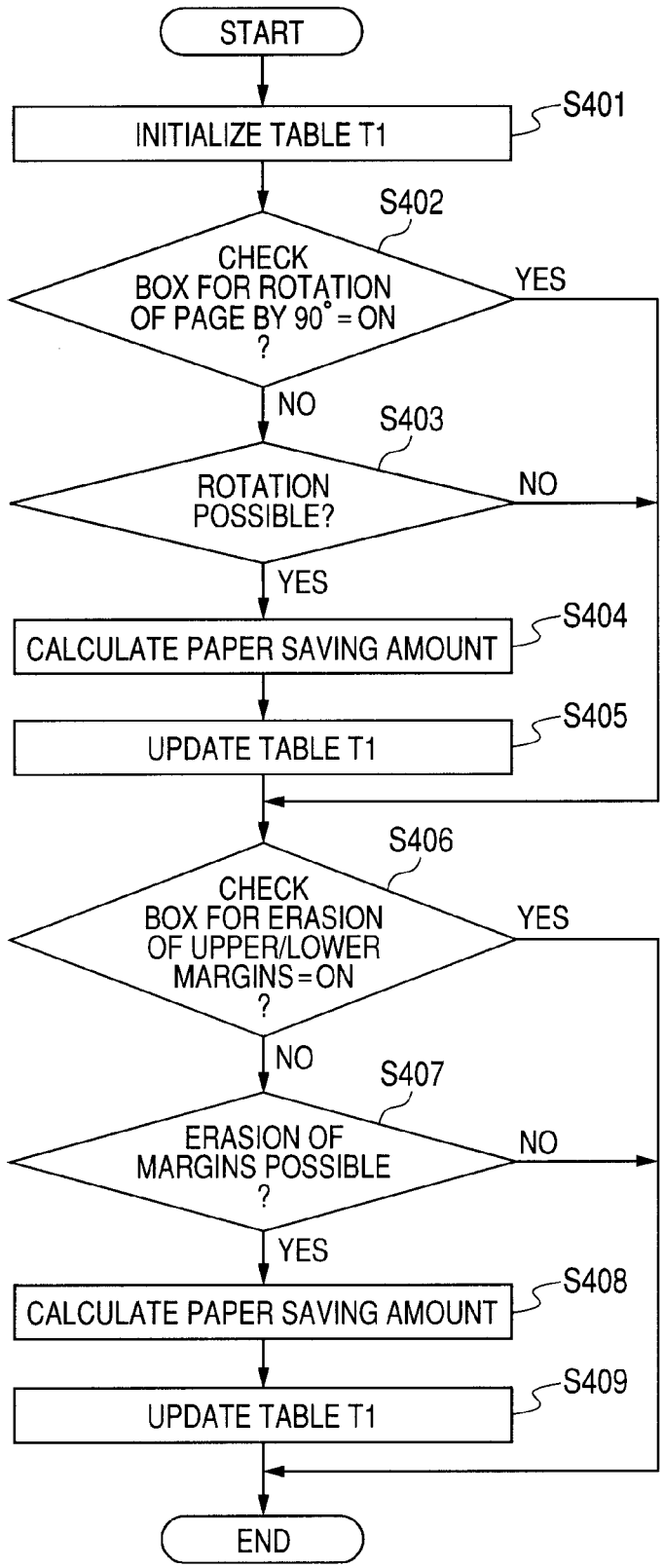
FIG. 4 is a flowchart illustrating a process for determining whether or not the paper can be saved.

FIG. 4 is a flowchart illustrating details of the process of S104.

When the process is started, first, a table T1 for determining whether or not the printing in which the paper is saved can be performed is formed in the RAM. The table T1 is initialized in S401.

FIG. 5 is a diagram illustrating an example of the table T1. The following items 501 to 503 are involved in the table T1 as items of the paper saving functions. The item 501 shows a processing result in the case where the page has been rotated by 90°. The item 502 shows a processing result in the case where the upper and lower margins have been erased and the page has been rotated by 90°. The item 503 shows a processing result in the case where the upper and lower margins have been erased but the page is not rotated by 90°. The processing result showing whether or not the paper can be saved (possible=True/impossible=False) and a paper saving amount (length) in the case of "True" are written in each of the items. In a state where the table T1 has been initialized, "False" is written in all of the determination results and "0 mm (zero millimeter)" is written in all of the paper saving amounts.

Subsequently, whether or not the check box 304 has been marked is determined in S402 based on the information acquired in S101. If it has been marked, since this means that the user has already instructed that the page is rotated by 90° as a paper saving function, whether or not the paper can be saved by rotating the page by 90° is not determined but the processing routine advances to S406. If the check box 304 is not marked, S403 follows and whether or not the original can be rotated by 90° and printed is determined based on the size of original as a print target displayed in the combo box 301 and the acquired width of roll paper which is used for printing. That is, whether or not the length of original in the direction corresponding to the roll paper width in the case where the original has been rotated by 90° is equal to or less than the acquired roll paper width is determined. If the printing in which the original has been rotated by 90° cannot be performed, S406 follows. In S404, the length of paper which can be saved when the original has been rotated by 90° as compared with that in the case where it is not rotated is calculated. It is assumed here that the size of the original is the vertically long size and the paper at the time when the original is rotated by 90° can be saved. Since the paper at the time when the original is rotated by 90° can be saved, in S405, the determination result in the item 501 on the table T1 indicates "True" and the paper saving amount is updated to the length (of paper which can be saved) calculated in S404. If the size of the original is the laterally long size and the paper at the time when the original is rotated by 90° cannot be saved, it is determined and its determination result may be reflected to the table T1.

Whether or not the check box 305 has been marked is determined in S406 based on the information acquired in S101. If it has been marked, since this means that the user has already instructed the operation for erasing the upper and lower margins as a paper saving function, whether or not the paper can be saved by erasing the upper and lower margins is not determined but the processing routine is finished. If the check box 305 is not marked, S407 follows, and whether or not there are the upper and lower margins which can be erased in the case where the original as a print target has been rotated by 90° and in the case where it is not rotated, is determined. If there are the margins which can be erased, the paper saving amounts of the upper and lower margins in the case where the original has been rotated by 90° and those in the case where it is not rotated are calculated in S408. In S409, the determination results in the items 502 and 503 on the table T1 indicate "True" and the paper saving amount is updated to the length (of paper which can be saved) calculated in S408. If the upper and lower margins which can be erased do not exist in the case where the original has been rotated by 90° or in the case where it is not rotated, the determination result is held to be "False".

Returning to FIG. 3, the contents of the table T1 updated as illustrated in FIG. 4 are confirmed in S105. If the determination result of "True" is included in any one of the items 501 to 503, the processing routine advances to S106. Since the check box 306 has been marked here, the print preview is performed. At this time, a largest one of the paper saving amounts on the table T1 is also simultaneously displayed. If the determination result of "True" is not included in the items 501 to 503, this means that the paper saving function cannot be used. The processing routine advances to S107 and the print preview is displayed without notifying that the paper can be saved.

Figure 6:
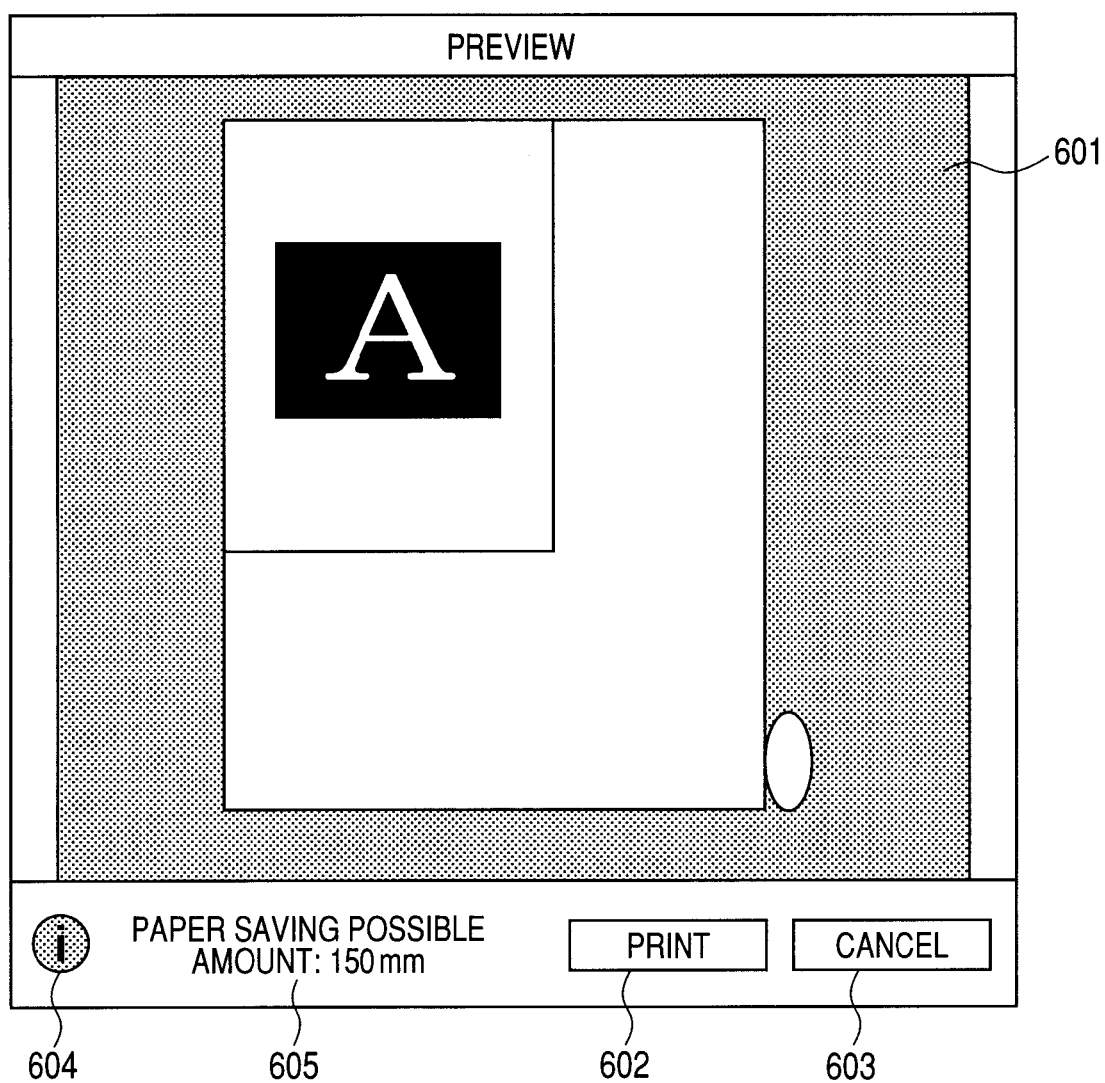
FIG. 6 is a diagram illustrating examples of a print preview.

FIG. 6 is a diagram illustrating an example of the print preview which is displayed in S106. The print preview is displayed on the display of the PC 201 under control of the print preview control unit 208.

A print preview display area 601, a print button 602, a cancel button 603, a button 604, and a paper saving possible amount display area 605 are included in the preview display screen.

How the original as a print target is arranged on the roll paper which is used for printing based on the information obtained in S101 and S103 is displayed in the print preview display area 601. The case where the roll paper has been selected as a paper feeding type is illustrated in FIG. 6. The paper feeding direction is a direction which is oriented from the lower position to the upper position. When the print button 602 is designated in this state, in the graphic processing unit 207, the process based on the paper saving function is not executed to the original as a print target but the original is converted into the print data and the print data is transmitted to the printer 202. When the cancel button 603 is designated, the window of FIG. 6 is closed and the printing process is cancelled. A maximum value of the paper saving possible amount is displayed in the display area 605. A larger one of the paper saving possible amount in the item 503 and the sum of the paper saving possible amounts in the items 501 and 502 is used here based on the table T1. That is, since the sum of the paper saving possible amounts in the items 501 and 502 is equal to 140 mm and the paper saving possible amount in the item 503 is equal to 150 mm in FIG. 6, 150 mm is displayed in the display area 605.

Figure 7:
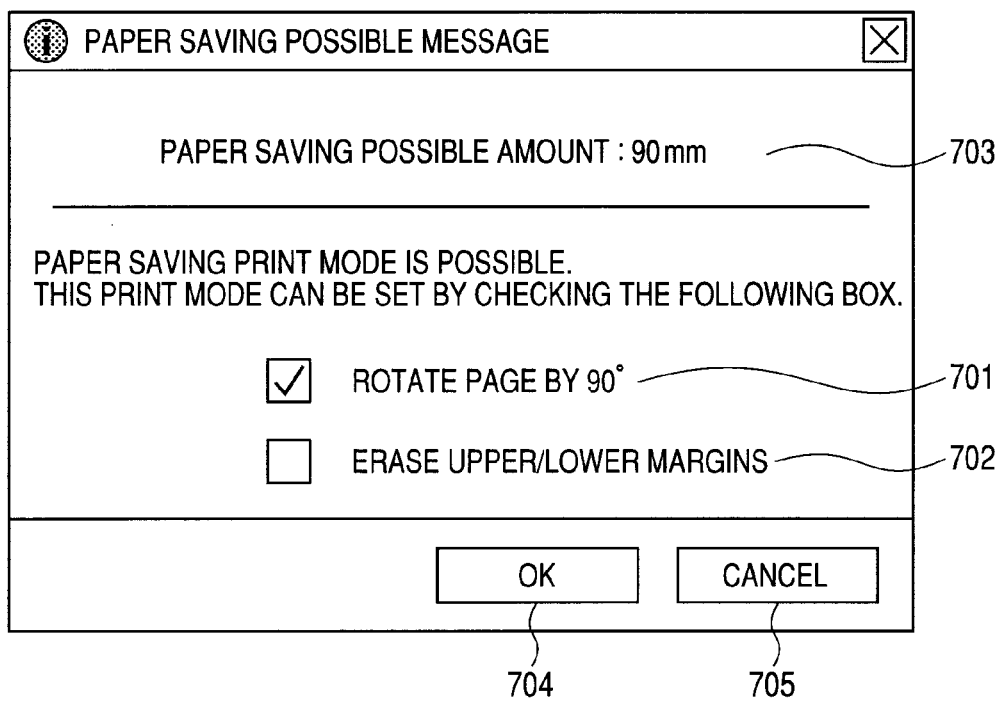
FIG. 7 is a diagram illustrating an example of a dialog adapted to notify that the paper can be saved.

When the button 604 is designated, a dialog like FIG. 7 for notifying the user that the paper can be saved is displayed. Although check boxes 701 and 702 are included in the dialog, the items of "False" on the table T1 cannot be selected.

The paper saving possible amount is displayed in a display area 703 according to the selecting states of the check boxes 701 and 702. Since the check box 701 has been marked in FIG. 7, 90 mm is displayed with reference to the value in the item 501 on the table T1.

When an OK button 704 is designated, the contents designated in the check boxes 701 and 702 are reflected to the print preview. When a cancel button 705 is designated, the display screen is returned to the display screen of FIG. 6.

Figure 8:
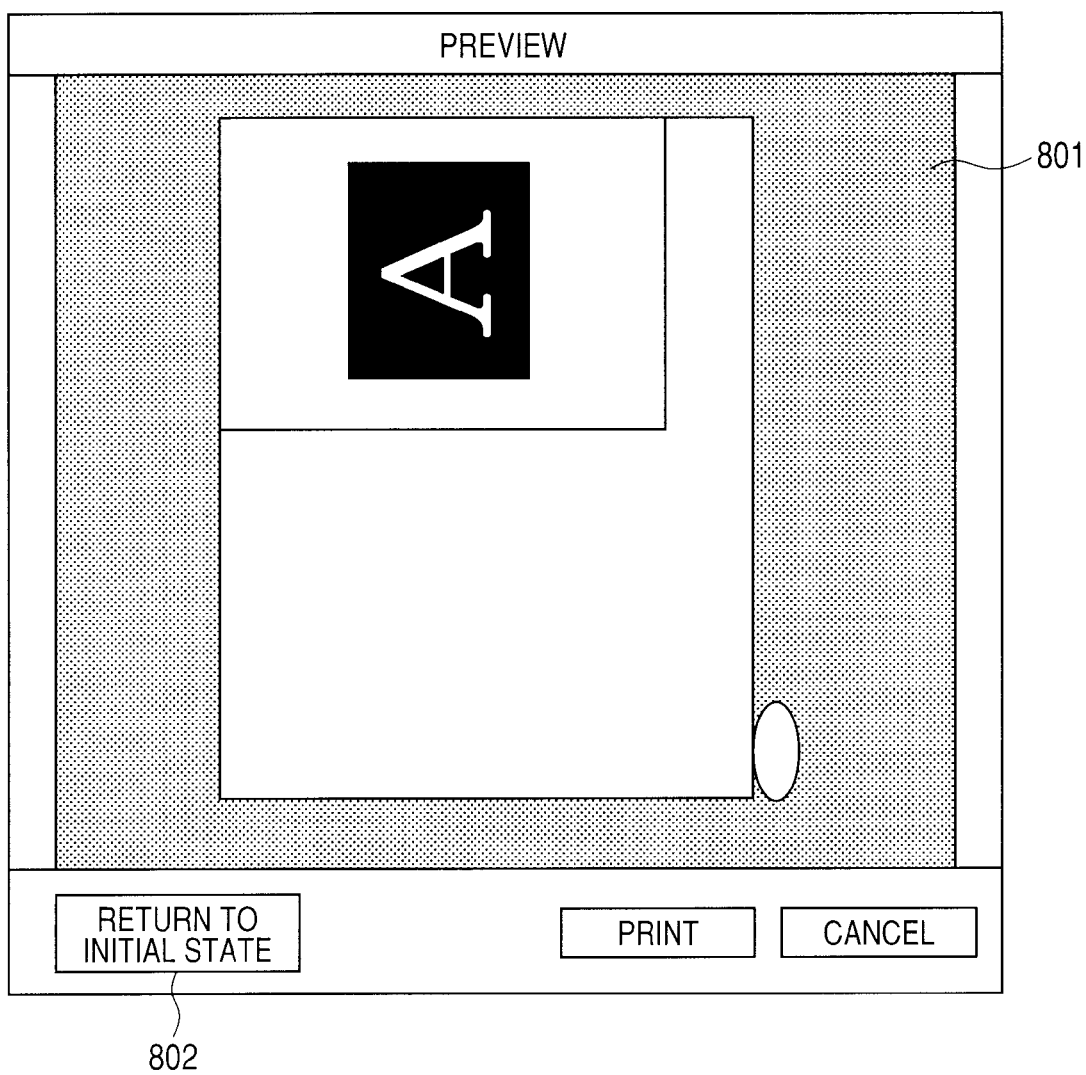
FIG. 8 is a diagram illustrating examples of a print preview.

FIG. 8 is a diagram illustrating the print preview which is displayed in the case where the OK button 704 is designated in the state where the check box 701 has been marked. A print preview display area 801 illustrates a state where the original of FIG. 6 has been rotated by 90°. When the print button is designated in this state, in the graphic processing unit 207, the original as a print target is rotated by 90° and, thereafter, it is converted into the print data and the print data is transmitted to the printer 202. In the display, the paper saving possible amount may be also simultaneously displayed. When a button 802 is designated, the display screen is returned to the display screen of FIG. 6.

FIG. 9 is a diagram illustrating the print preview which is displayed in the case where the OK button 704 is designated in the state where the check box 702 has been marked. A print preview display area 901 illustrates a state where the upper and lower margins have been erased from the original of FIG. 6. When the print button is designated in this state, in the graphic processing unit 207, the upper and lower margins are erased from the original as a print target and, thereafter, the original is converted into the print data and the print data is transmitted to the printer 202. Other operations are similar to those in the example of FIG. 8.

When both of the check boxes 701 and 702 have been marked in FIG. 7, the original in the case where the original was rotated by 90° and the upper and lower margins were erased is displayed. Other operations are similar to those in the cases of FIGS. 8 and 9.

The print preview in the case where the paper saving function is used and the print preview in the case where it is not used may be simultaneously displayed as illustrated in FIG. 10. That is, when the OK button 704 is designated in the dialog of FIG. 7, the print preview of FIG. 10 is displayed in place of the print previews of FIGS. 8 and 9. A print preview display area 1001 is similar to that of FIG. 6. A print preview display area 1002 is similar to those of FIGS. 8 and 9. A button 1003, a print button 1004, and a cancel button 1005 are also similar to those described above and their description is omitted here.

According to the embodiment as mentioned above, when the user does not use the paper saving function, the user can easily recognize the existence of the paper saving function which was not used. When the printing in which the paper can be saved by an amount larger than that in the case of the present print settings can be performed, the user can easily recognize it.

Further, according to the embodiment mentioned above, the user can easily recognize the paper saving amount which can be saved by setting the paper saving function. Moreover, the user can easily compare the print result obtained in the case where the paper saving function has been set and that in the case where the paper saving function is not set. The user can easily select the setting of the paper saving function.

By the print preview having those functions, the user can easily set the paper saving function while previously confirming the print result and can properly suppress wasteful use of the paper upon printing.

In the above embodiment, when the dialog of FIG. 7 is displayed, the marking states of the check boxes 701 and 702 may be reflected so that the maximum amount of paper can be saved. That is, since it is the item 503 that the printer driver 204 can mostly save the paper amount with reference to the table T1, the marking of the check box 701 is reset and the check box 702 is marked in the dialog of FIG. 7. Thus, in this example merely by designating the OK button 704 with the check box 702 marked and the check box 701 unmarked, the user can execute the printing in which the paper amount can be saved the most.

When the print preview of FIG. 6 is displayed, such a print preview that the state of the item 503 in which the paper amount can be mostly saved has been reflected may be displayed. Consequently, merely by designating the print button 602 as it is, the user can execute the printing in which the paper amount can be saved the most.

Although the case where the print data is transmitted from the PC 201 to the printer 202 and printed has been described above as an example, the invention can be also applied to such a system that a scanner for reading the original is provided for the printer 202 and an image of the original read out by the scanner is printed. In this case, the printer 202 is a print control apparatus, the processes executed by the PC 201 as described above are executed by the printer 202 and the display information is displayed onto an operation panel or the like of the printer 202. A controller (print control apparatus) of the printer 202 allows its own printer unit (printer apparatus) to execute the printing.

The invention is also realized by executing the following processes: processes which are executed in the case where software (program) for realizing the functions of the embodiments mentioned above is supplied to a system or an apparatus through a network or various kinds of storage media and a computer (or a CPU, an MPU, or the like) of the system or apparatus reads out and executes the program. The program which is executed by the printer apparatus may be executed by one CPU or may be executed by a plurality of CPUs in an interlocking relational manner. The processes may be executed by properly combining software and hardware. The program may be executed by a CPU of an apparatus provided outside the printer apparatus in place of the CPU in the printer apparatus.

The invention is not limited to the foregoing embodiments but various modifications (including a combination of a plurality of embodiments) are possible based on a spirit of the invention and they are not excluded from the scope of the invention.

Although the various examples and embodiments of the invention have been described above, the spirit and scope of the invention is not limited by the specific description of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-056096, filed Mar. 10, 2009, which is hereby incorporated by reference herein in its entirety.

What is claimed is:

1. A print control apparatus for controlling a print unit to print an image using a continuous sheet, based on a print setting set by a user, comprising:
   a determining unit configured to determine whether a saving print setting different from a designated print setting exists without receiving a user's instruction, wherein the saving print setting makes possible a saving of a length of the continuous sheet compared to the designated print setting;
   a specifying unit configured to specify the length of the continuous sheet which can be saved in the case of printing according to the saving print setting determined by the determining unit as the print setting different from the designated print setting, as compared with printing according to the designated print setting, in a case where the determining unit determines such a saving print setting exists;

a notifying unit configured, in the case that the determining unit determines such a saving print setting exists, to notify a user of the existence of the saving print setting determined by the determining unit and the length of the continuous sheet specified by the specifying unit; and a receiving unit configured to receive a user's instruction indicating whether a print setting is changed from the designated print setting to the saving print setting so as to print the image.

2. An apparatus according to claim 1, wherein the determining unit is configured to make the determination based on a size of the image and a size of the continuous sheet used for printing.

3. An apparatus according to claim 1, further comprising a preview unit configured to provide a print preview to be displayed on a display device showing how the image is arranged on the continuous sheet in the case of printing according to the continuous sheet saving print setting.

4. An apparatus according to claim 3, wherein the preview unit is configured to provide a print preview in the case of printing according to the designated print setting and a print preview in the case of printing according to the continuous sheet saving print setting to be displayed.

5. An apparatus according to claim 1, wherein the notifying unit notifies the user of the existence of the saving print setting determined by the determining unit and the length of the continuous sheet specified by the specifying unit before the printing of the image is executed using the continuous sheet based on the designed print setting or the continuous sheet saving print setting.

6. An apparatus according to claim 1, wherein the saving of the length of the continuous sheet is saved by rotating the image for printing and/or by erasing margin, in a continuous sheet feeding direction, of the image.

7. An apparatus according to claim 1, wherein the length of the continuous sheet is saved by erasing margin in which a valid image is not included in the image, in a continuous sheet feeding direction, of the image.

8. An apparatus according to claim 1, further comprising a calculation unit configured to calculate a maximum value of a continuous sheet saving possible length, in a case where a plurality of saving patterns of the continuous sheet are available.

9. An apparatus according to claim 1, further comprising a preview unit configured to provide a print preview to be displayed on a display device showing how the image is arranged on the continuous sheet in the case of printing according to the designated print setting.

10. An apparatus according to claim 9, wherein the notifying unit displays the existence of the saving print setting and the length of the continuous sheet on the display device being displayed in the print preview.

11. A print control method of controlling a print unit to print an image using a continuous sheet, based on a print setting set by a user, the method comprising:

determining whether a saving print setting different from a designated print setting exists without receiving a user's instruction, wherein the saving print setting makes possible a saving of a length of the continuous sheet compared to the designated print setting;

specifying the length of the continuous sheet which can be saved in the case of printing according to the saving print setting determined in the determining step as the print setting different from the designated print setting, as compared with printing according to the designated print setting, in a case where it is determined that such a saving print setting exists;

in the case that it is determined that such a saving print setting exists, notifying a user of the existence of the saving print setting determined in the determining step and the specified length of continuous sheet; and receiving a user's instruction indicating whether a print setting is changed from the designated print setting to the saving print setting so as to print the image.

12. A non-transitory computer-readable storage medium storing a program to be executed by a computer, said program adapted for controlling a print unit to print an image using a continuous sheet, based on a print setting set by a user, the program comprising:

code for determining whether a saving print setting different from a designated print setting exists without receiving a user's instruction, wherein the saving print setting makes possible a saving of a length of a continuous sheet compared to the designated print setting;

code for specifying the length of the continuous sheet which can be saved in the case of printing according to the saving print setting determined by the determining code as the print setting different from the designated print setting, as compared with printing according to the designated print setting, in a case where it is determined that such a saving print setting exists;

code for, in the case that it is determined by the determining code that such a saving print setting exists, notifying a user of the existence of the saving print setting determined by the determining code and the length of the continuous sheet specified by the specifying code; and code for receiving a user's instruction whether a print setting is changed from the designated print setting to the saving print setting so as to print the image.

13. An apparatus, comprising:

a designating unit configured to designate a print setting;

a determining unit configured to determine saving amount information of a sheet based on the print setting designated by the designating unit; and a display control unit configured to cause a display unit to display a print preview of an image and the saving amount information of the sheet determined by the determining unit on a preview display screen, in a case where a print preview processing is performed before printing.

14. An apparatus according to claim 13, wherein the saving amount information is varied according to the designated print setting.

15. An apparatus according to claim 13, wherein on the preview display screen, the printing can be instructed.

16. An apparatus according to claim 13, wherein the designating unit designates the print setting and whether a print preview processing is performed before printing an image in accordance with an instruction input through a screen provided by a printer driver, and the display control unit causes the display unit to display the print preview of the image and the saving amount information of the sheet determined by the determining unit on the preview display screen, in a case where the designating unit designates that the print preview processing is performed before printing.

17. An apparatus according to claim 16, wherein the screen provided by the printer driver is a screen displayed in a case where a print apparatus is selected.

18. A method executed by an apparatus, comprising:
designating a print setting;
determining saving amount information of a sheet based on the designated print setting; and
displaying a print preview of the image and the determined saving amount information of the sheet on a preview display screen, in a case where print preview processing is performed before printing.

19. A method according to claim 18, wherein the saving amount information is varied according to the designated print setting.

20. A method according to claim 18, wherein on the preview display screen, the printing can be instructed.

21. A method according to claim 18, wherein the designating step designates the print setting and whether a print preview processing is performed before printing an image in accordance with an instruction input through a screen provided by a printer driver, and the print preview of the image and the determined saving amount information of the sheet are displayed on the preview display screen, in a case where the designating unit designates that the print preview processing is performed before printing.

22. A method according to claim 21, wherein the screen provided by the printer driver is a screen displayed in a case where a print apparatus is selected.

23. A non-transitory computer-readable storage medium storing a program to be executed by a computer, said program adapted for controlling an apparatus, comprising:
designating a print setting;
determining saving amount information of a sheet based on the designated print setting; and
displaying a print preview of the image and the determined saving amount information of the sheet on a preview display screen, in a case where print preview processing is performed before printing.

24. A non-transitory computer-readable storage medium according to according to claim 23, wherein the saving amount information is varied according to the designated print setting.

25. A non-transitory computer-readable storage medium according to according to claim 23, wherein on the preview display screen, the printing can be instructed.

26. A non-transitory computer-readable storage medium according to according to claim 23, wherein the designating step designates the print setting and whether a print preview processing is performed before priming an image in accordance with an instruction input through a screen provided by a printer driver, and the print preview of the image and the determined saving amount information of the sheet are displayed on the preview display screen, in a case where the designating unit designates that the print preview processing is performed before printing.

27. A non-transitory computer readable storage medium according to according to claim 26, wherein the screen provided by the printer driver is a screen displayed in a case where a print apparatus is selected.

28. An apparatus, comprising:
a designating unit configured to designate a print setting;
a determining unit configured to determine saving information of a sheet based on the print setting designated by the designating unit; and
a display control unit configured to cause a display unit to display a print preview of an image and the saving information of the sheet determined by the determining unit on a preview display screen, in a case where a print preview processing is performed before printing,
wherein the saving information displayed on the preview display screen is changed from a first saving information to a second saving information in a case where the designating unit changes the print setting from a first print setting to a second print setting.

29. An apparatus according to claim 28, wherein the designating unit designates the print setting and whether a print preview processing is performed before printing an image in accordance with an instruction input through a screen provided by a printer driver, and the display control unit causes the display unit to display the print preview of the image and the saving information of the sheet determined by the determining unit on the preview display screen, in a case where the designating unit designates that the print preview processing is performed before printing.

30. An apparatus according to claim 29, wherein the screen provided by the printer driver is a screen displayed in a case where a print apparatus is selected.

31. An apparatus according to claim 28, wherein on the preview display screen, the printing can be instructed.

32. A method executed by an apparatus, comprising:
designating a print setting;
determining saving information of a sheet based on the designated print setting; and
displaying a print preview of an image and the determined saving information of the sheet on a preview display screen, in a case where a print preview processing is performed before printing,
wherein the saving information displayed on the preview display screen is changed from a first saving information to a second saving information in a case where the print setting is changed from a first print setting to a second print setting.

33. A method according to claim 32, wherein the designating step designates the print setting and whether a print preview processing is performed before printing an image in accordance with an instruction input through a screen provided by a printer driver, and wherein the print preview of the image and the determined saving information of the sheet are displayed on the preview display screen, in a case where the designating step designates that the print preview processing is performed before printing.

34. A method according to claim 33, wherein the screen provided by the printer driver is a screen displayed in a case where a print apparatus is selected.

35. A method according to claim 32, wherein on the preview display screen, the printing can be instructed.

36. A non-transitory computer-readable storage medium storing a program to be executed by a computer, the program adapted for controlling an apparatus, the program comprising:
code for designating a print setting;
code for determining saving information of a sheet based on the designated print setting;
code for displaying a print preview of an image and the determined saving information of the sheet on a preview display screen, in a case where a print preview processing is performed before printing; and
wherein the saving information displayed on the preview display screen is changed from a first saving information to a second saving information in a case where the print setting is changed from a first print setting to a second print setting.

37. A non-transitory computer-readable storage medium according to claim 36, wherein the designating step designates the print setting and whether a print preview processing is performed before priming an image in accordance with an instruction input through a screen provided by a printer driver, and wherein the print preview of the image and the determined saving information of the sheet are displayed on the preview display screen, in a case where the designating step designates that the print preview processing is performed before printing.

38. A non-transitory computer-readable storage medium according to claim 37, wherein the screen provided by the printer driver is a screen displayed in a case where a print apparatus is selected.

39. A non-transitory computer-readable storage medium according to claim 36, wherein on the preview display screen, the printing can be instructed.

* * * * *